US010038556B2

(12) United States Patent
Akiba

(10) Patent No.: US 10,038,556 B2
(45) Date of Patent: Jul. 31, 2018

(54) INFORMATION PROCESSING APPARATUS, ENCRYPTION APPARATUS, AND CONTROL METHOD

(71) Applicant: CANON KABUSHIKI KAISHA, Tokyo (JP)

(72) Inventor: Tomohiro Akiba, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 91 days.

(21) Appl. No.: 15/077,541

(22) Filed: Mar. 22, 2016

(65) Prior Publication Data
US 2016/0285632 A1 Sep. 29, 2016

(30) Foreign Application Priority Data
Mar. 24, 2015 (JP) ................. 2015-061688

(51) Int. Cl.
H04L 9/08 (2006.01)
G09C 1/00 (2006.01)

(52) U.S. Cl.
CPC .............. H04L 9/0894 (2013.01); G09C 1/00 (2013.01); H04L 9/0822 (2013.01)

(58) Field of Classification Search
None
See application file for complete search history.

(56) References Cited

U.S. PATENT DOCUMENTS

| 6,983,374 | B2* | 1/2006 | Hashimoto | G06F 21/10 713/189 |
| 7,353,404 | B2* | 4/2008 | Hashimoto | G06F 21/10 713/194 |
| 9,064,135 | B1* | 6/2015 | Poo | G06F 21/72 |
| 2005/0132226 | A1* | 6/2005 | Wheeler | H04L 9/088 726/4 |
| 2006/0005049 | A1* | 1/2006 | Randell | G06F 21/6209 713/193 |
| 2009/0037747 | A1* | 2/2009 | Xie | G06F 21/85 713/192 |
| 2013/0159699 | A1* | 6/2013 | Torkkel | G06F 21/6245 713/155 |
| 2016/0321133 | A1* | 11/2016 | Oliver | G06F 11/1004 |
| 2017/0104736 | A1* | 4/2017 | Seul | G06F 21/6218 |
| 2018/0006815 | A1* | 1/2018 | Young | H04L 9/0897 |

FOREIGN PATENT DOCUMENTS

JP 2007-336446 A 12/2007

* cited by examiner

Primary Examiner — Christopher Revak
(74) Attorney, Agent, or Firm — Canon U.S.A., Inc. IP Division

(57) ABSTRACT

An information processing apparatus includes a storage unit, an encryption processing unit that encrypts data to be stored in the storage unit, and a control unit that stores a first key in a unit different from the encryption processing unit, wherein the first key, which is used to decrypt data encrypted by the encryption processing unit and stored in the storage unit, is encrypted using a second key set in the encryption processing unit.

10 Claims, 4 Drawing Sheets

INFORMATION PROCESSING APPARATUS, ENCRYPTION APPARATUS, AND CONTROL METHOD

BACKGROUND

Field

Aspects of the present invention generally relate to a method for managing keys for data encryption.

Description of the Related Art

In recent years, it has become common that information processing apparatuses accumulate large volumes of data in a secondary storage device, such as a hard disk.

With the increase in the amount of data being accumulated, the amount of user data stored in the secondary storage device has also increased. This user data must be strictly protected in order to be protected from unauthorized access, which can result in extensive damage to a user if such data is accessed without authorization.

A method for protecting user data is to encrypt the user data using an encryption processing unit. The encryption processing unit includes functions of encrypting data, to which a write instruction is issued, using an internally pre-stored encryption key, and writing the encrypted data in a secondary storage device. The encryption processing unit further includes functions of decrypting data using the encryption key read from the secondary storage device, and transmitting the decrypted data to a host computer.

Storing data encrypted by the encryption processing unit in the secondary storage device enables prevention of the data from being easily decrypted even if the secondary storage device is stolen. This results in providing security against unauthorized access of the data.

Key factors for encryption are the encryption algorithm and the encryption key. The encryption algorithm is widely disclosed to the public and checked by many people so that robustness and safety of the algorithm is ensured. On the other hand, the encryption key needs to be strictly managed.

As one method for managing an encryption key, Japanese Patent Application Laid-Open No. 2007-336446 discusses a technique for storing an encryption key inside an encryption chip so that the encryption key is prevented from being extracted.

However, the encryption processing unit may have to be replaced because of a failure of the encryption processing unit or a failure of a hardware substrate including the encryption processing unit. In such a case, the encryption key will also be lost at the same time. If the encryption key is lost, it becomes impossible to decrypt encrypted data stored in the secondary storage device, and data cannot be restored.

There may be considered a method for backing up the encryption key in the encryption processing unit. However, in a case where the encryption key in the encryption processing unit is backed up in a state where the encryption key can be used by anyone and if the encryption key is leaked, the data stored in the secondary storage device may be decrypted and security may not be maintained.

SUMMARY

Aspects of the present invention are generally directed to a method for maintaining security of a key while backing up the key is enabled.

According to an aspect of the present invention, an information processing apparatus includes a storage unit, an encryption processing unit configured to encrypt data to be stored in the storage unit, and a control unit configured to store a first key in a unit different from the encryption processing unit, wherein the first key, which is used to decrypt data encrypted by the encryption processing unit and stored in the storage unit, is encrypted using a second key set in the encryption processing unit.

Further features of aspects of the present invention will become apparent from the following description of exemplary embodiments with reference to the attached drawings.

DESCRIPTION OF THE EMBODIMENTS

Aspects of the present invention will be described below with reference to the accompanying drawings.

Figure 1:
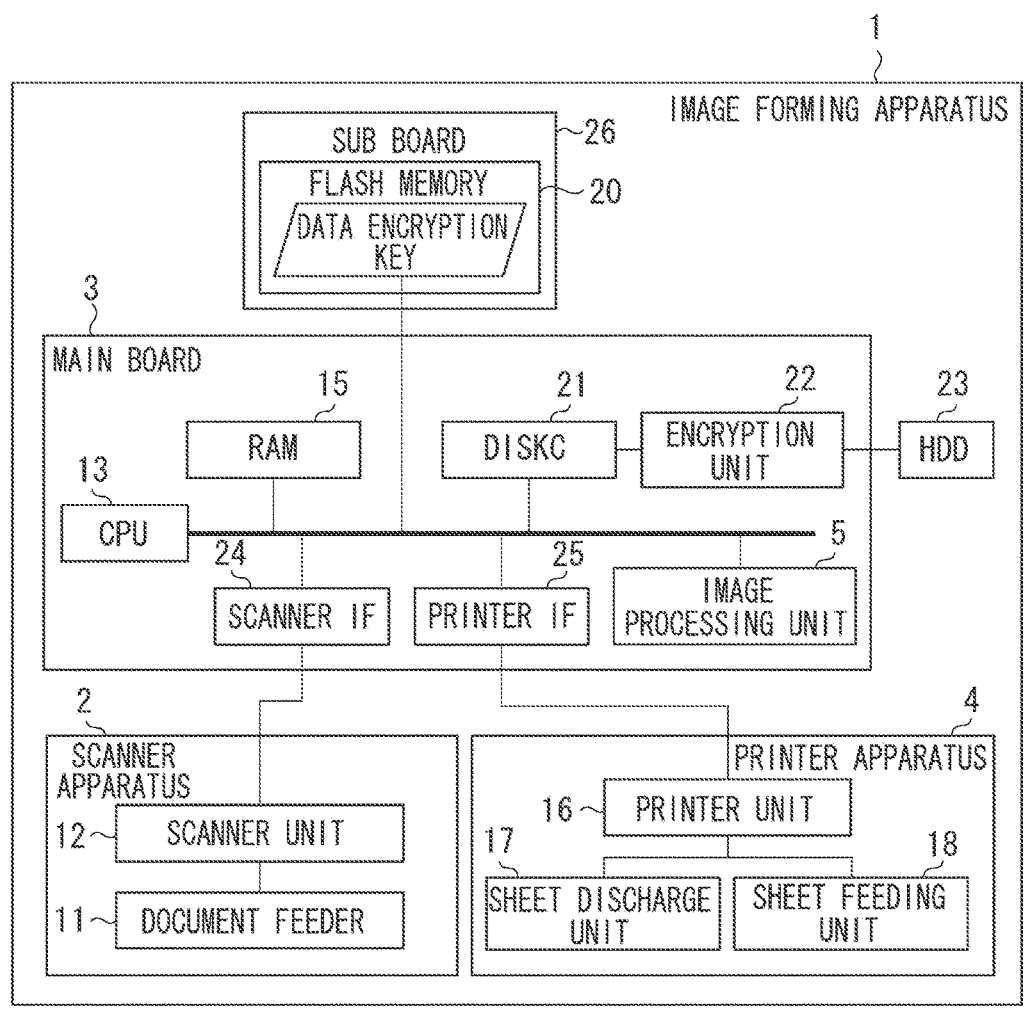
FIG. 1 is a diagram illustrating a hardware configuration of an image forming apparatus.

FIG. 1 is a diagram illustrating a hardware configuration of an image forming apparatus as an example of an information processing apparatus. An image forming apparatus 1 includes a main board 3 including a main central processing unit (CPU) and an encryption unit 22, a sub board 26 including a flash memory 20, and a hard disk drive (HDD) 23 as an auxiliary storage device (secondary storage device). The image forming apparatus 1 further includes, for example, a scanner apparatus 2 for reading a document and a printer apparatus 4 for printing an image.

The main board 3 mounts a CPU 13, a random access memory (RAM) 15, a scanner interface (IF) 24, a printer IF 25, an image processing unit 5, a disk controller (DISKC) 21, and the encryption unit 22. The CPU 13 is a central processing unit for performing system control and calculation processing. In the present exemplary embodiment, the CPU 13 serves as a control unit that provides an instruction for data accessing in the HDD 23, validates a data encryption key of the encryption unit 22, and provides instructions for backing up and restoring a data encryption key as required.

The RAM 15, which is a main storage device represented by a Double-Data-Rate (DDR) memory, is used, for example, as a work area for a program and a storage area for print data. The image processing unit 5 performs various types of image processing on obtained image data. For example, the image processing unit 5 performs reduction processing on image data stored in the RAM 15, and stores the resultant data in the RAM 15 again.

The disk controller (DISKC) 21 performs control for communication with the HDD 23 conforming to the serial ATA standard.

The encryption unit 22 performs data encryption processing according to a write instruction transmitted from the CPU 13 via the disk controller 21. The encryption unit 22 also performs decryption processing on data read from the HDD 23 according to a read instruction from the CPU 13.

In the present exemplary embodiment, a common data encryption key is used for the encryption processing and the decryption processing. However, different keys may be used for the encryption processing and the decryption processing. The data encryption key is stored in the encryption unit 22.

The data encryption key can be extracted according to an instruction from the CPU 13 at a timing when backup is required. Further, the data encryption key is set as a new key according to an instruction from the CPU 13 at a timing for restoring.

The scanner apparatus 2 includes a document feeder 11 with which a document bundle can be replaced as required, and a scanner unit 12 for scanning a document and converting the scanned image into digital image. The digital image data obtained by the scanner unit 12 is transmitted to a scanner IF 24.

The printer apparatus 4 includes a sheet feeding unit 18 that can feed sheets one by one from a sheet bundle, a printer unit 16 for printing image data on a fed sheet, and a sheet discharge unit 17 for discharging a printed sheet.

The HDD 23 is a secondary storage device for storing digital images and control programs. Various types of data, such as application files, document files, photographic data, and individual data may be stored in the HDD 23. The HDD 23 is connected with the disk controller 21 via the encryption unit 22. The data to which a write instruction is provided from the disk controller 21 is subjected to the encryption processing by the encryption unit 22 and is stored in the HDD 23. The data read from the HDD 23 according to a read instruction from the disk controller 21 is subjected to the decryption processing by the encryption unit 22, and is transmitted to the disk controller 21.

The flash memory 20 is mounted on the sub board 26. The flash memory 20 is a nonvolatile memory capable of holding data even when power of the image forming apparatus is turned off. The flash memory 20 stores setting information required for the disk controller 21 to operate.

An encryption key called a "data encryption key" extracted from the encryption unit 22 is stored in the flash memory 20. The data encryption key is stored in a flash memory 20 mounted on a board different from the main board 3 in order that encrypted data in the HDD 23 is enabled to be decrypted when the main board 3 is replaced. Further, the data encryption key stored in the flash memory is encrypted using an encryption key called a "key encryption key" for ensuring robust security.

In the present exemplary embodiment, the data encryption key is stored in the image forming apparatus 1. However, the data encryption key may be stored in another apparatus connected to the image forming apparatus 1, e.g., via a network.

Figure 2:
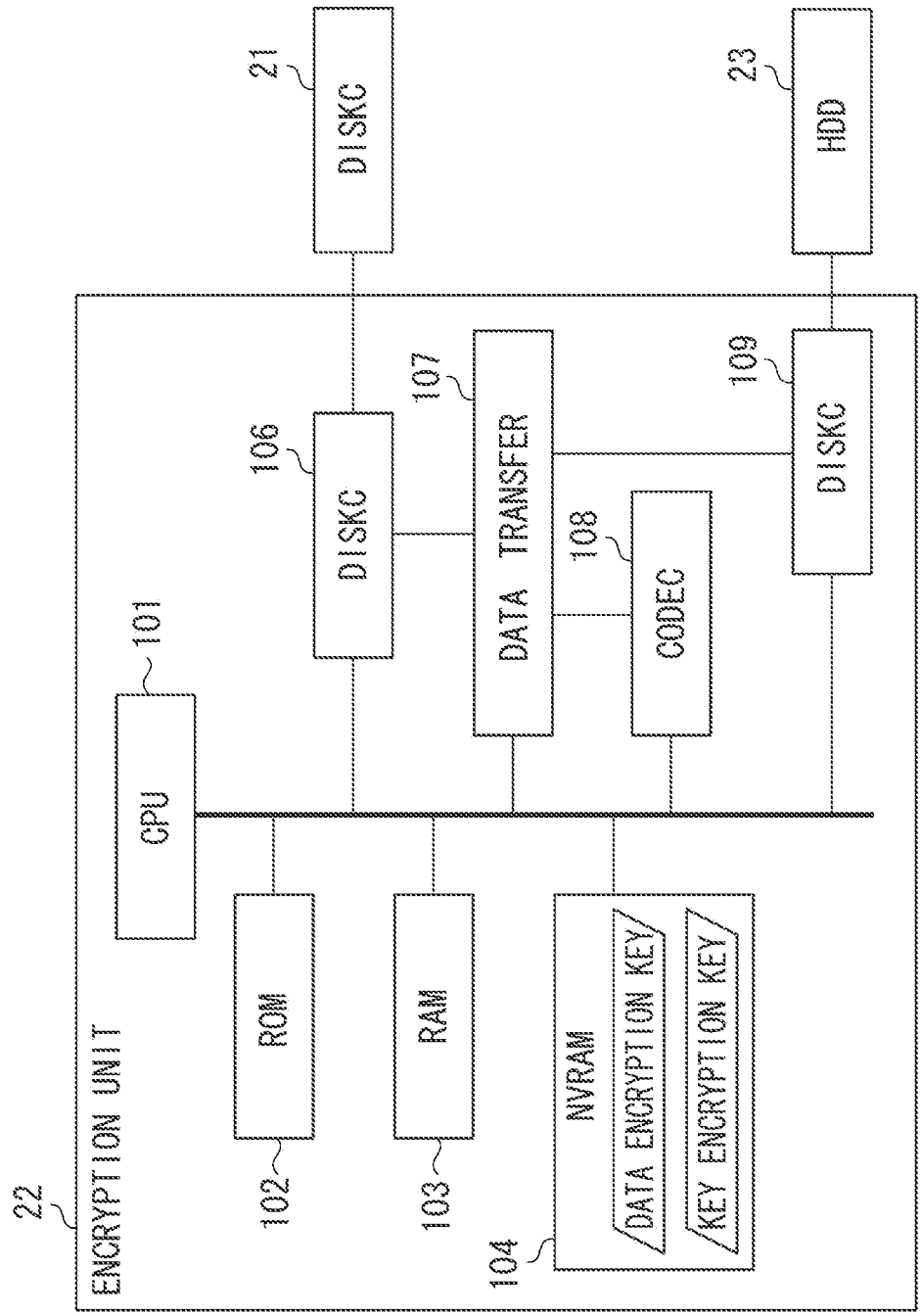
FIG. 2 is a diagram illustrating a hardware configuration of an encryption unit.

FIG. 2 is a diagram illustrating a hardware configuration of the encryption unit 22 illustrated in FIG. 1. A CPU 101 of the encryption unit 22 is connected to a system bus, and controls the encryption unit 22 using a read only memory (ROM) 102 and a RAM 103. A nonvolatile RAM (NVRAM) 104 stores information, such as settings and statuses, required for the encryption unit 22 to operate. The contents of the NVRAM 104 are held even if power of the encryption unit 22 is turned OFF. The NVRAM 104 is a key storage unit for storing the data encryption key and the key encryption key.

Disk controllers (DISKCs) 106 and 109 are connected with the disk controller 21 and the HDD 23, respectively, to transfer and receive a command and data to/from respective units.

A data transfer unit 107 is connected to the disk controllers 106 and 109 and an encryption processing unit 108. After the encryption processing unit (CODEC) 108 processes data received from one disc controller, the data transfer unit 107 transmits the processed data to the other disk controller.

Figure 3:
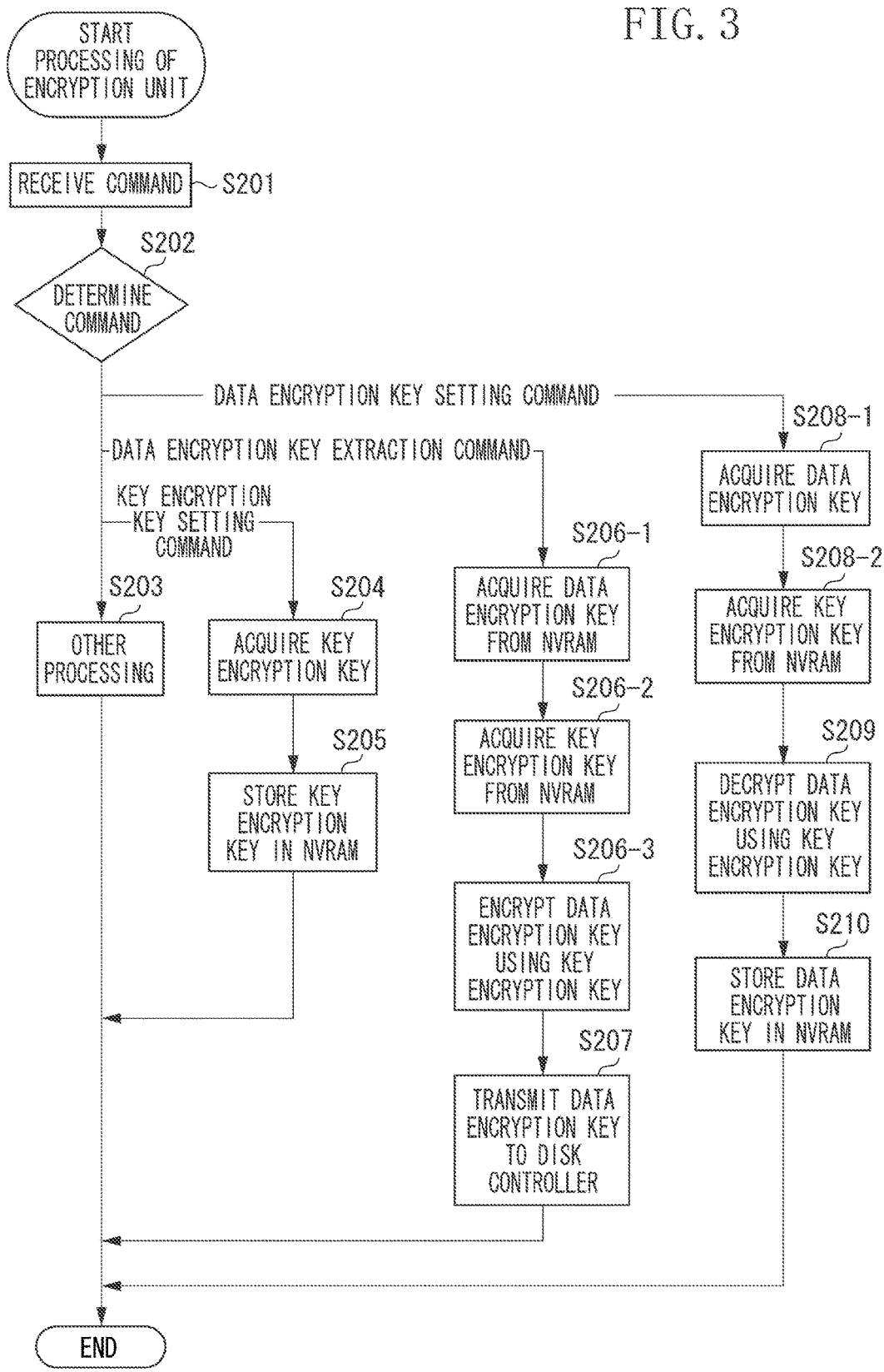
FIG. 3 is a flowchart illustrating processing performed by the encryption unit.

FIG. 3 is a flowchart illustrating processing performed by the encryption unit 22. Unless otherwise noted, each step of the flowchart illustrated in FIG. 3 is performed by the CPU 101 in the encryption unit 22.

In step S201, the CPU 101 of the encryption unit receives various types of commands from the disk controller 21. In step S202, the CPU 101 determines each of the received command, and performs processing corresponding to each of the received commands.

In a case where the received command is determined to be the "key encryption key setting command" (KEY ENCRYPTION KEY SETTING COMMAND in step S202), the processing proceeds to step S204. The key encryption key setting command is a command for setting, in the encryption unit 22, the key to be used for encrypting the data encryption key itself, i.e., the key encryption key. The key encryption key setting command includes the key encryption key as a parameter, and is issued by the CPU 13 when the image forming apparatus 1 is activated.

In step S204, the CPU 101 acquires the key encryption key included in the key encryption key setting command as a parameter. In step S205, the CPU 101 stores the acquired key encryption key in the NVRAM 104.

In a case where the received command is determined to be the "data encryption key extraction command" (DATA ENCRYPTION KEY EXTRACTION COMMAND in step S202), the processing proceeds to step S206-1. The data encryption key extraction command is issued when the data encryption key stored in the encryption unit 22 is backed up. In a case where the CPU 13 of the image forming apparatus 1 determines that the data encryption key is to be backed up, the data encryption key extraction command is issued. In the present exemplary embodiment, when the image forming apparatus 1 is activated, the CPU 13 validates the data encryption key in the encryption unit 22. In a case where the CPU 13 has validated the data encryption key, the data encryption key is determined to be backed up.

In step S206-1, the CPU 101 acquires the data encryption key stored in the NVRAM 104. Since the data encryption key is stored in the NVRAM 104 as a clear text, it is necessary to encrypt the data encryption key itself when the data encryption key is output outside of the encryption unit 22. In the present exemplary embodiment, the processing for encrypting the data encryption key is performed using the key encryption key. In step S206-2, the CPU 101 acquires the key encryption key from the NVRAM 104. In step S206-3, the CPU 101 encrypts the data encryption key using the acquired key encryption key. In step S207, the encrypted data encryption key is transmitted to the disk controller 21.

In a case where the received command is determined to be the "data encryption key setting command" (DATA ENCRYPTION KEY SETTING COMMAND in step S202), the processing proceeds to step S208-1. The data encryption key setting command is a command for setting a new data encryption key to the encryption unit 22. The data encryption key setting command is issued when the backed up data encryption key is restored. The data encryption key setting command includes the data encryption key backed up in the flash memory 20 as a parameter, and is issued according to an instruction of the CPU 13 of the image forming apparatus 1. In step S208-1, the CPU 101 acquires the data encryption key included in the data encryption key setting command as a parameter. In step S208-2, the CPU 101 acquires the key encryption key stored in the NVRAM 104. In step S209, the CPU 101 decrypts the data encryption key using the key encryption key. In step S210, the CPU 101 stores the decrypted data encryption key in the NVRAM 104 as a new data encryption key.

Other processing in step S203 includes, for example, processing performed in a case where the data write command (write instruction) is received and processing performed in a case where the data read command (read instruction) is received. In a case where the data write instruction is received, target data is encrypted using the data encryption key and then the encrypted data is transmitted to the HDD 23. On the other hand, in a case where the data read instruction is received, target data read from the HDD 23 is decrypted and then the decrypted data is transmitted to the disk controller 21.

Although, in the above-described descriptions, the key encryption key and the data encryption key received by the encryption unit 22 are not validated, a step for validating these keys may be added.

Figure 4:
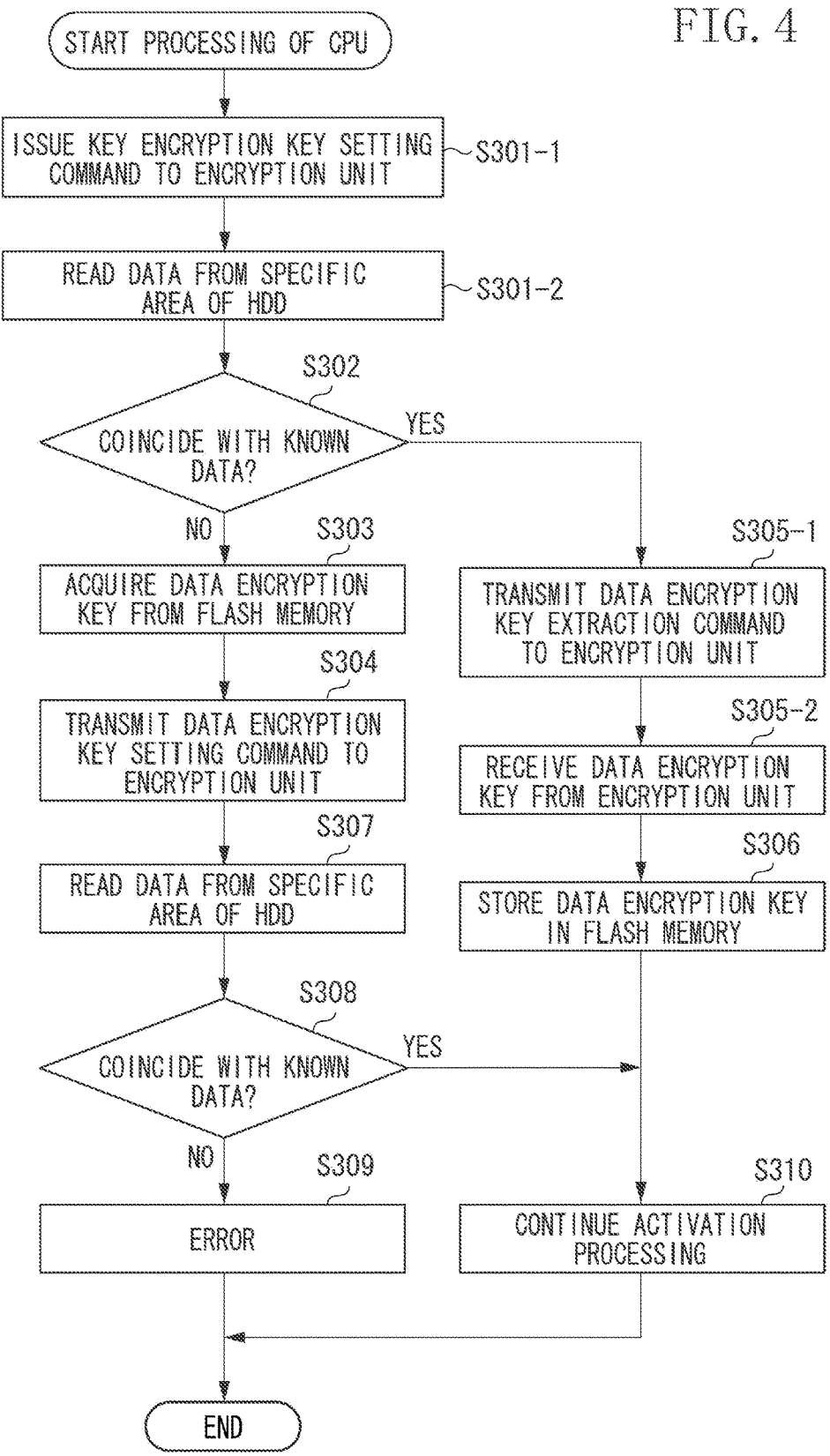
FIG. 4 is a flowchart illustrating processing performed when the image forming apparatus is activated.

FIG. 4 is a flowchart illustrating processing performed by the CPU 13 of the image forming apparatus 1. This processing is one of various initialization processes performed after power of the image forming apparatus 1 is turned on. Unless otherwise noted, the CPU 13 in the main board 3 controls the processing. An instruction to the encryption unit 22 is provided via the disk controller 21.

In step S301, the CPU 13 transmits (issues) the key encryption key setting command to the encryption unit 22 via the disk controller 21. Although the key encryption key included in the key encryption key setting command will not be described in detail below, an identifier (ID) specific to the image forming apparatus 1, an ID specific to the hard disk, other fixed values, or the like may be used.

In step S301-2, the CPU 13 instructs the encryption unit 22 to read data from a specific area in the HDD 23. According to the instruction, the encryption unit 22 reads the specified data from the specific area in the HDD 23, decrypts the data using the data encryption key, and transfers the decrypted data to the CPU 13. In step S302, the CPU 13 determines whether the data read from the specific area and transferred from the encryption unit 22 coincides with known data. In a case where the CPU 13 determines that the data coincides with the known data (YES in step S302), the CPU 13 determines that at least any part of neither the HDD 23 nor the encryption unit 22 has been replaced, and the processing proceeds to step S305-1. The processing in step S302 is an example of processing for confirming the consistency between the data encryption key and the encrypted data.

The result of this determination (YES in step S302) means that the data encryption key is consistent with the encrypted data. Then, the processing proceeds to step S305-1 in order that the data encryption key is backed up in the flash memory 20. In step S305-1, the CPU 13 transmits the data encryption key extraction command to the encryption unit 22. In steps S305-2, the CPU 13 receives the encrypted data encryption key as a response to the data encryption key extraction command. In step S306, the CPU 13 stores the encrypted data encryption key in the flash memory 20.

On the other hand, in a case where the CPU 13 determines that the data transferred from the encryption unit 22 does not coincide with the known data (NO in step S302), any part of either the HDD 23 or the encryption unit 22 may have been replaced. Then, the processing proceeds to step S303 in order that processing for restoring the data encryption key backed up in the flash memory 20 is performed.

In step S303, the CPU 13 acquires the encrypted data encryption key stored in the flash memory 20. In step S304, the CPU 13 transmits, to the encryption unit 22, the data encryption key setting command including the data encryption key as a parameter.

In steps S307 and S308, the CPU 13 performs processing for confirming the consistency between the data encryption key and the encrypted data again. The processing in steps S307 and S308 performed for checking the consistency between the data encryption key and the encrypted data is similar to the processing in steps S301-2 and S302, respectively.

In a case where the CPU 13 determines that the data does not coincide with the known data (NO in step S308), then in step S309, the processing is terminated as an error. The result of this determination (NO in step S308) means that the data encryption key is not consistent with the encrypted data even after restoring of the relevant key. That is, the result indicates a case, for example, where a different HDD is connected.

On the other hand, in a case where the CPU 13 determines that the data coincides with the known data (YES in step S308), then in step S310, activation processing continues. The result of this determination (YES in step S308) applies to a case, for example, where the encryption unit 22 or the main board 3 has been replaced.

As an example of another method for determining whether any part has been replaced, the ID of the encryption unit 22 is stored in the flash memory 20 and verification of the ID is performed.

According to the present exemplary embodiment described above, in a case where the main board 3 including the encryption unit 22 is replaced because of a failure of the main board 3, the data of the HDD 23 in which the data encryption key is backed up can be restored to the flash memory 20 mounted on the sub board 26. In addition, the data encryption key itself to be backed up is encrypted using the key encryption key, whereby robust security can be ensured.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-061688, filed Mar. 24, 2015, which is hereby incorporated by reference herein in its entirety.

What is claimed is:

1. An information processing apparatus comprising:
   an encryption processing device, which is configured to connect to a storage memory, encrypt data to be stored in the storage memory and decrypt the encrypted data read from the storage memory; and
   a control unit configured to perform control to back-up a first key into a memory unit which is different from the encryption processing device, wherein the first key, which is used to decrypt data encrypted by the encryption processing device and stored in the storage memory, is encrypted using a second key set in the encryption processing device,
   wherein, during an initialization process after the control unit is powered on, the control unit obtains an initial key from the encryption processing device and checks whether the data stored in the storage memory can be decrypted by using the initial key by determining whether data read from a specific area of the storage memory and decrypted by using the initial key coincides with predetermined data,
   wherein, in a case where a check result indicates the data stored in the storage memory can be decrypted by using the initial key, the control unit backs-up the initial key encrypted by using the second key in the memory unit which is different from the encryption processing device, and
   wherein, in a case where the check result does not indicate the data stored in the storage memory can be decrypted by using the initial key, the control unit acquires a back-up key which has been stored in the memory unit, and replace the initial key in the encryption processing device by the acquired back-up key.

2. The information processing apparatus according to claim 1, wherein the second key is set in the encryption processing device according to a command from the control unit.

3. The information processing apparatus according to claim 1, wherein the control unit checks a consistency between the first key and the data stored in the storage device, and
   wherein, based on the control unit having checked that there is the consistency, the control unit stores the initial key encrypted using the second key in the memory unit different from the encryption processing unit.

4. The information processing apparatus according to claim 3, wherein the control unit checks the consistency between the initial key and the data stored in the storage memory by determining whether data read from a specific area of the storage memory coincides with specific data.

5. The information processing apparatus according to claim 1, wherein the control unit checks a consistency between the initial key and the data stored in the storage memory, and
   wherein, based on the control unit having checked that there is no consistency, the control unit acquires the first key encrypted using the second key and is stored in the memory unit different from the encryption processing device, and sets the acquired first key in the encryption processing device.

6. The information processing apparatus according to claim 1, wherein the encryption processing device encrypts, according to a command from the control unit, the data to be stored in the storage memory using the first key.

7. The information processing apparatus according to claim 1, wherein the encryption processing device decrypts, according to a command from the control unit, data read from the storage device using the first key.

8. The information processing apparatus according to claim 1, wherein the storage memory is an auxiliary storage device.

9. The information processing apparatus according to claim 1, wherein the encryption processing device further includes a key storage memory configured to store the first key.

10. A method for controlling an information processing apparatus including an encryption processing device, which is configured to connect to a storage memory, encrypt data to be stored in the storage memory, the method comprising:
    backing-up a first key, encrypted using a second key set in the encryption processing device, into a memory unit different from the encryption processing device, wherein the first key is used to decrypt data that encrypted by the encryption processing device and stored in the storage unit,
    wherein, during an initialization process obtains an initial key from the encryption processing device and checks whether the data stored in the storage memory can be decrypted by using the initial key by determining whether data read from a specific area of the storage memory and decrypted by using the initial key coincides with predetermined data,
    wherein, in a case where a check result indicates the data stored in the storage memory can be decrypted by using the initial key, backs-up the initial key encrypted by using the second key in the memory unit which is different from the encryption processing device, and
    wherein, in a case where the check result does not indicate the data stored in the storage memory can be decrypted by using the initial key, acquires a back-up key which has been stored in the memory unit, and replace the initial key in the encryption processing device by the acquired back-up key.

* * * * *